Oct. 29, 1935.  J. F. BRITTAIN  2,019,392
TRACTOR WINCH AND SPUDDING ATTACHMENT THEREFOR
Filed March 29, 1934  4 Sheets-Sheet 1

Oct. 29, 1935. J. F. BRITTAIN 2,019,392
TRACTOR WINCH AND SPUDDING ATTACHMENT THEREFOR
Filed March 29, 1934 4 Sheets-Sheet 2

Inventor
John F. Brittain
By Francis B. Lees
Attorney

Oct. 29, 1935.  J. F. BRITTAIN  2,019,392
TRACTOR WINCH AND SPUDDING ATTACHMENT THEREFOR
Filed March 29, 1934   4 Sheets-Sheet 3

Inventor
John F. Brittain
By Francis B. Leech
Attorney

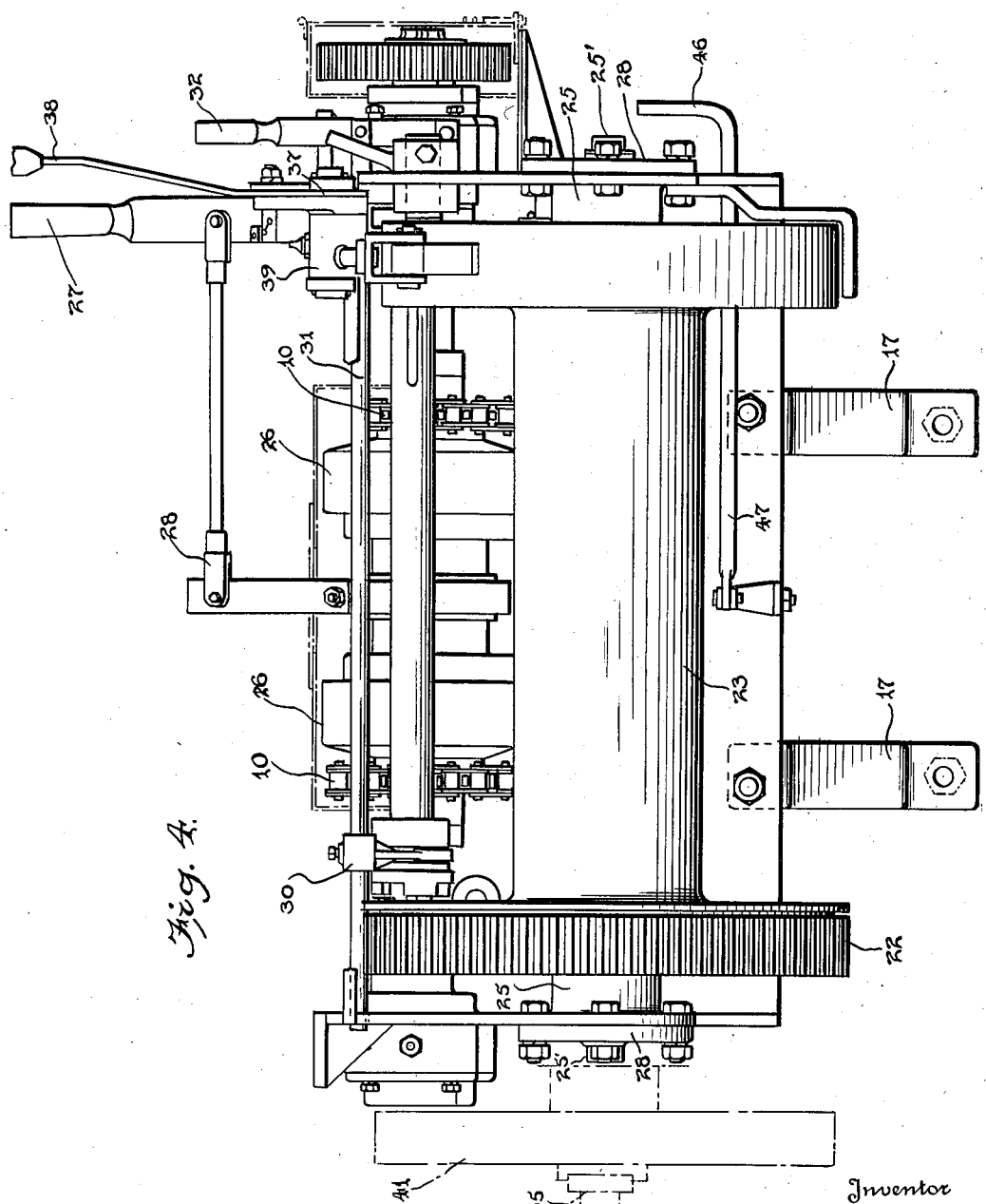

Patented Oct. 29, 1935

2,019,392

UNITED STATES PATENT OFFICE 2,019,392

TRACTOR WINCH AND SPUDDING ATTACHMENT THEREFOR

John F. Brittain, Erie, Pa.

Application March 29, 1934, Serial No. 718,039

5 Claims. (Cl. 255—3)

The present invention has to do with power driven hoist line machinery attachable to the front or rear end of a tractor, particularly of the crawler or track-laying type.

More, especially, the invention relates to a winch positioned on the front or rear end of a tractor and receiving its power from the power plant of the tractor.

One object of the invention is to construct and attach the winch on the tractor in such a manner that it will be capable of performing various kinds of work.

Still another object of the invention is to utilize the train of gearing which normally operates the winch for operating a spudding attachment. The spudding attachment is of great value in working in the oil fields, as it often happens that it is necessary to reopen wells whose walls have collapsed. On such occasions, it is desirable to lower a string of tools while, at the same time, to jerk the tool line to facilitate the passage of the tools past the collapsed portion of the walls.

Fig. 4 is a front plan elevation of the winch illustrating its attachment to the tractor with the spudding attachment shown in dotted lines.

Figure 1:
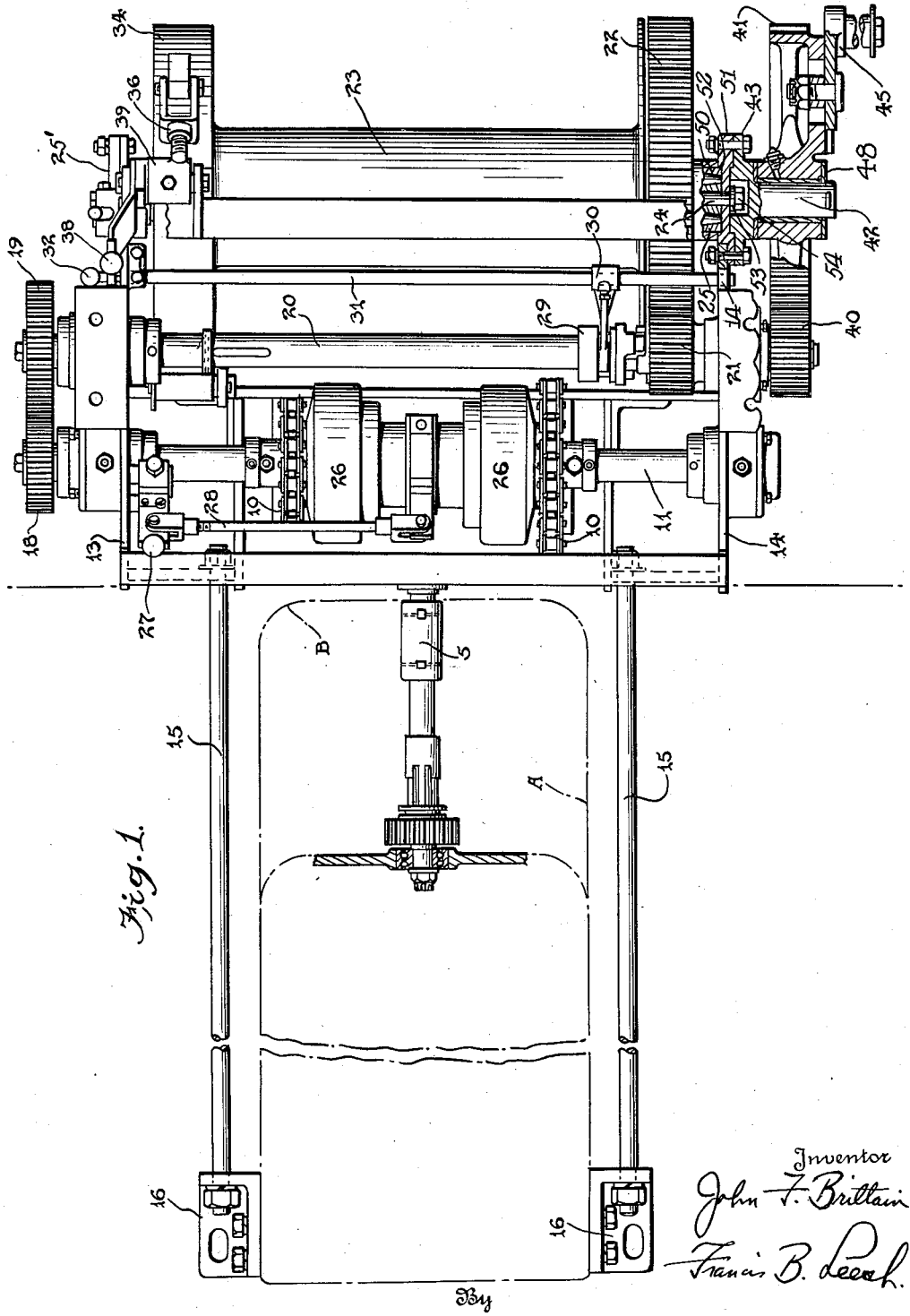
Fig. 1 is a top plan view of the winch and spudding mechanism showing their attachment to a tractor.
Figure 2:
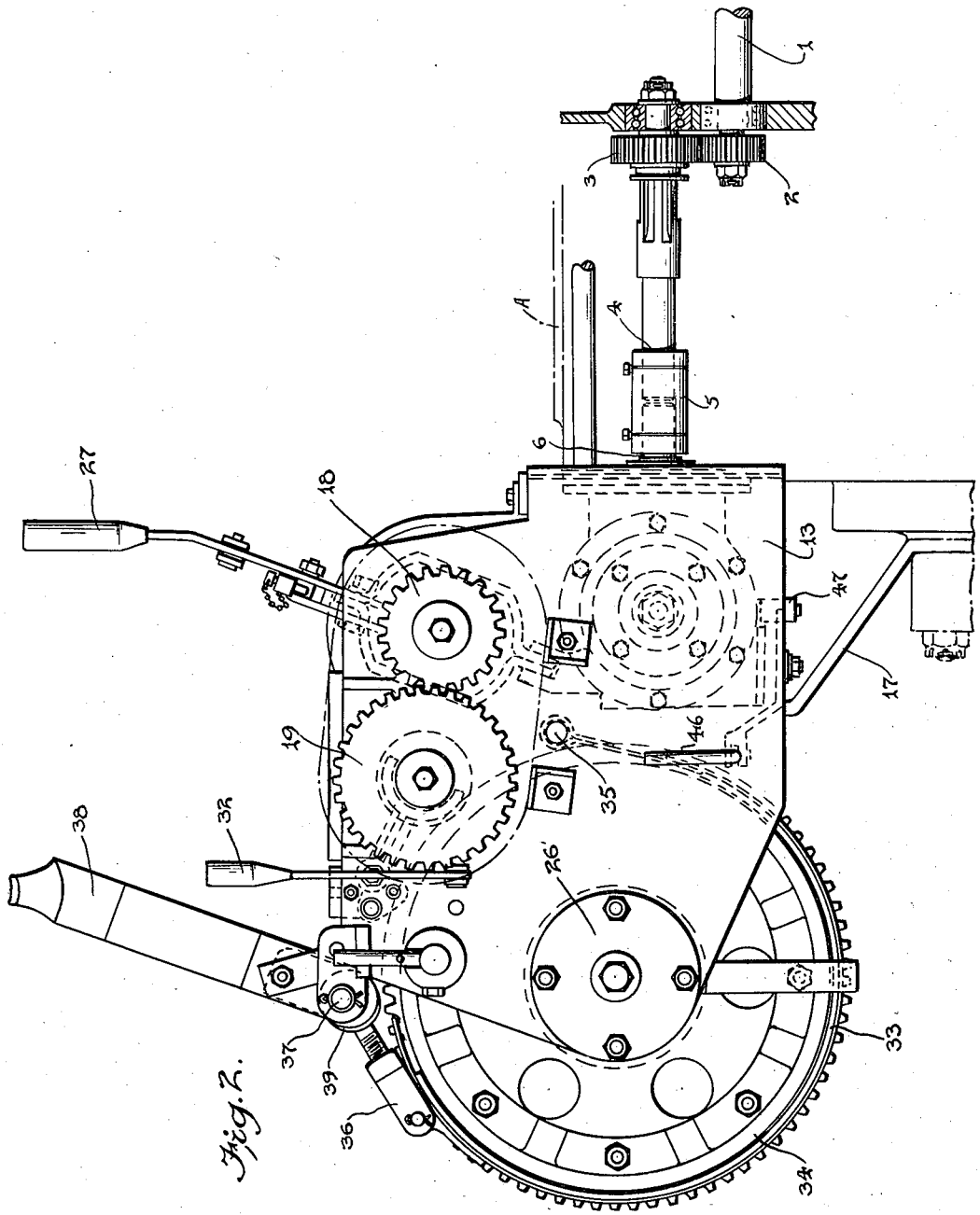
Fig. 2 is a side elevation, partly in section, of the winch.
Figure 3:
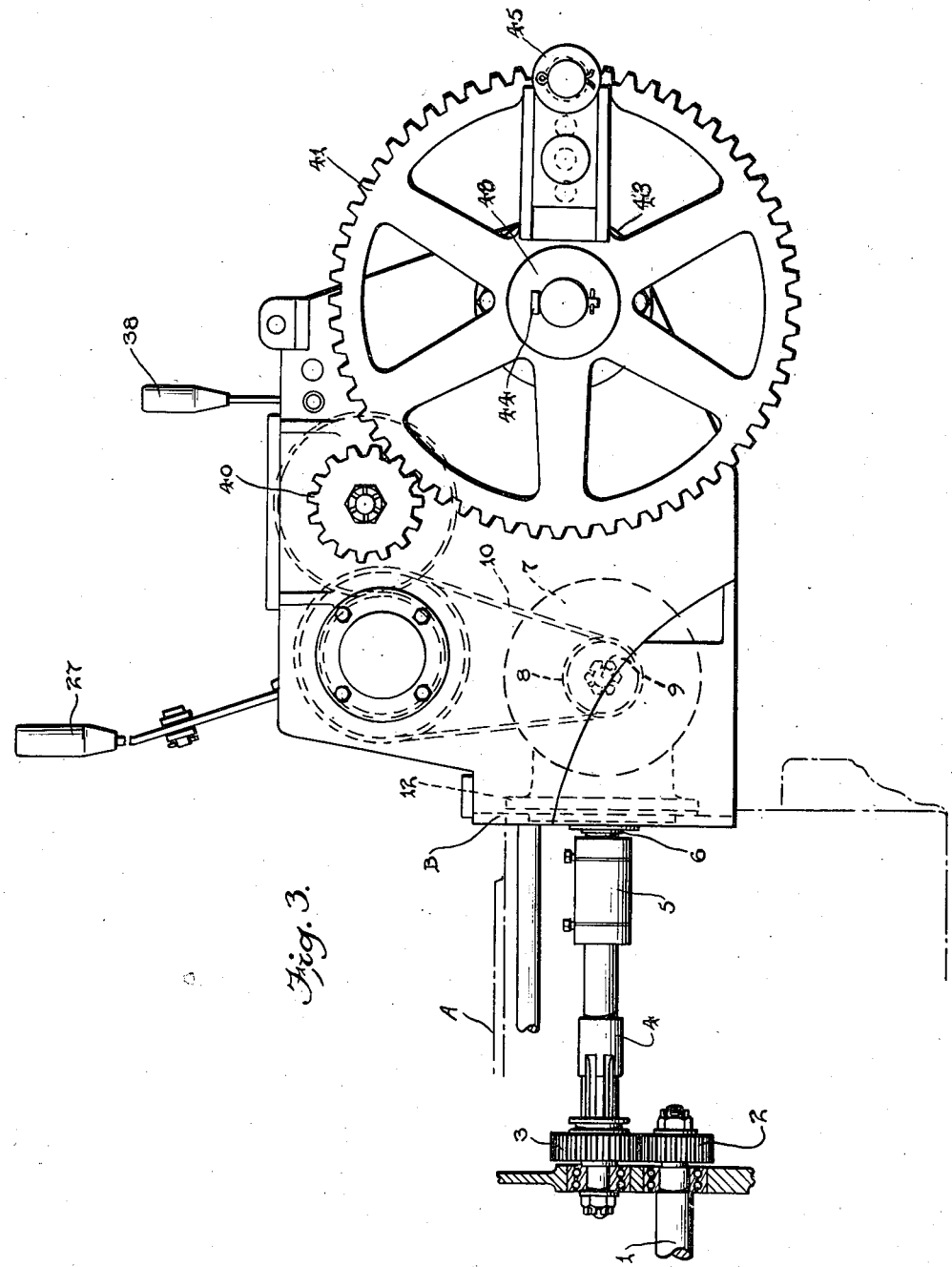
Fig. 3 is a side elevation, partly in section, of the opposite side from Fig. 2, together with the spudding attachment.

Referring to Figs. 1, 2 and 3, it will be seen that A represents the rear portion of the tractor transmission case, while B denotes the end plate of said case against which the winch is supported. A power shaft 1, suitably connected to the tractor engine, terminates in the transmission case A. On the end of the shaft is pinion 2 meshing with pinion 3 splined on shaft 4. Sleeve coupling 5 is aligned and affixed to shaft 4 and winch power shaft 6, the shaft 6 projecting interiorly of the transmission case A through an opening formed in the end plate B. Winch shaft 6 rotates pinion 7 carrying sprocket 8 on horizontal shaft 9 for applying power through chains 10 to the upper horizontal shaft 11.

The end plate 12 of the winch is fitted against the rear of the tractor housing B and rigidly secured thereto by spaced side strain rods 15, terminating at the front end of the tractor in brackets 16. The winch is also supported underneath by offset brackets 17 which are affixed to any rigid portion of the end of the tractor, as, for instance, the draw-bar lugs on the rear of the transmission case. Attached to the end plate 12 are forwardly extending side frames 13 and 14. Carried between the side frames are the several shafts and other mechanisms to be hereinafter described.

An upper horizontal transverse shaft 11 is suitably journalled in bearings carried by the side plates 13 and 14, and terminates outside of the side bar 13 in a gear pinion 18 meshing with a second drive pinion 19 affixed to parallel horizontal shaft 20, also journalled in side plates 13 and 14. The shaft 20 carries a reduction pinion 21 inside of the side plate 14 which meshes with large winch pinion 22. A winch drum 23 affixed to pinion 22 is mounted between the extreme rearward portions of the side frames 13—14 and rotates on anti-friction bearings 50 fitted into the end tubes 25—25 projected from each end of the drum. The bearings 50 are also fitted into countersunk side plates 51—51 which are bolted through openings 52 in the side frames and are normally covered by end caps 25'—25'. A stationary tie-rod or shaft 24 extends horizontally through the drum 23, the bearings 50 and side plates 13—14; the tie-rod being rigidly retained in position by end washers 53 and bolt 54. These tubes are bolted to side plates 13 and 14 and are provided with end caps 25' and 26'.

The speed of rotation of power shaft 11 is controlled by low and high speed chains 10 through selective power clutches 26 which are controlled by manually shiftable lever 27 through linkage 28.

It will thus be seen that, when it is desired to operate the winch drum 23, power from the tractor shaft 4 is applied to drive pinion 7, and through either of drive chains 10 to shaft 11. The torque applied to shaft 11 through either of the selective clutches 26 is transmitted to pinion 18 which meshes with pinion 19 to rotate shaft 20. The pinion 21 carried on the shaft 20 meshes in turn with the winch pinion 22. Pinion 21 may be thrown in or out of engagement with pinion 22 by means of shiftable splined collar 29 through the medium of shiftable yoke 30 attached to shift rod 31 mounted through the side plates and shiftable by handle 32. Jaw clutch notches and lugs are formed on the abutting sides of gear 21 and splined collar 29 to insure proper engagement.

An annular brake drum 33 is bolted to one end of the winch drum 23 with a flexible brake band 34 fixed at 35 and attached to adjustable link 36 overlying the drum. Pivoted at 37 to the side frame 13 is an operating handle 38 having a cam 39 to which the link 36 is secured.

Referring again to shaft 20, it will be noted that, aside from pinion 21, this shaft also carries pinion 40 on its outer end. Normally this pinion 40 merely revolves with shaft 20. However, when it is desired to operate a spudding mechanism the pinion 40 meshes with the spudding gear 41 for driving the same.

Figs. 1 and 3 illustrate the spudding attachment which consists of a spudding gear 41 rotatable on dead axle 42. The dead axle comprises a flange 43 adapted to be bolted on side plate 51 in place of end cap 25'. Over the dead axle 42 the spudding gear 41 is secured by washer 48 and cotter pin 44.

Any conventional reversing mechanism may be employed for reversing the direction of drive of the power clutches 26. For the sake of illustration this reversing mechanism is denoted by lever 46 and linkage 47.

From the foregoing it will be understood that when power is applied to shaft 20 and handle 32 is shifted to disengage splined collar 29 with pinion 21, no power is transmitted to winch gear 22. Spudding pinion 40, however, being affixed to shaft 20 continues to rotate. Spudding gear 41 mounted on the dead axle 42 meshes with pinion 40 and is consequently rotated. An adjustable pitman 45 is bolted to one of the webs of spudding gear 41 for transmission of power to a jerk-line, walking beam or pump rack.

With the present tractor winch and spudding attachment, it is merely necessary to position the tractor adjacent the well rigging and, after winding the tool line on winch 23, attach another line from spudding attachment 45 in a manner to jerk the tool line. It is obvious that with the present mechanism the tool line may be lowered or raised as desired, while the line may be jerked, thus permitting the string to drop into the well. The rotation of the winch is controlled by the clutch collar 29 and brake operator 38. When the tools strike the caved-in portion, the spudding attachment is easily brought into play by the mere shifting of the jaw clutch to disengage the winch pinion 21 and rotate only spudding gear 41.

What I claim is:

1. In combination, a tractor, a power take-off device connected thereto, a winch attached to said tractor and receiving its operating power through said take-off device, and a detachable spudding attachment mounted on a dead axle and adapted to be affixed to said winch and receive its operating power from the winch operating means.

2. In a device of the character described, a winch adapted to be supported on a tractor and receive its operating power therefrom, said winch including a plurality of horizontal power driven shafts, one of said shafts having two drive pinions mounted thereon; one of which is adapted to selectively engage a winding drum pinion carried on the second of said horizontal shafts, a dead axle extension on said second shaft, and a spudding gear carried thereon, the said spudding gear meshing with the second of said drive pinions mounted on the first mentioned power driven shaft.

3. A tractor winch and spudding device including spaced side frames, a plurality of horizontal drive shafts journalled therebetween, one of said shafts carrying a winch drum and drive gear therefor, another of said shafts carrying two drive pinions, one of which is inside and the other outside of said side frame, a dead axle extension affixed to the said side frame, the said outside drive pinion adapted to engage spudding gear mounted on the said dead axle extension.

4. A tractor winch and spudding device including a plurality of horizontal shafts, one of said shafts having two drive gears attached thereto meshing with a winch drum gear attached to the second of said shafts, a spudding gear carried on a dead axle extension adjacent and in alignment with the second of said horizontal shafts, and means for selectively rotating the winch drum gear.

5. In a combined tractor winch and spudding device, a pair of spaced side frames, a plurality of spaced horizontal power shafts carried between said side frames, gearing connecting said shafts, a drum gear mounted on one of said shafts, a spudding gear mounted on a dead axle forming an extension of said drum shaft and driven by said gearing and means whereby the drum gear may be selectively driven without affecting the drive of the spudding gear.

JOHN F. BRITTAIN.